(12) United States Patent
DeFazio et al.

(10) Patent No.: US 12,093,921 B2
(45) Date of Patent: Sep. 17, 2024

(54) METHOD AND SYSTEM FOR ACTIVE NFC PAYMENT DEVICE MANAGEMENT

(71) Applicant: Shopify Inc., Ottawa (CA)

(72) Inventors: Michael Joseph DeFazio, Fonthill (CA); John Jong-Suk Lee, Waterloo (CA); Neil Leonard Padgett, Toronto (CA)

(73) Assignee: Shopify Inc., Ottawa (CA)

( * ) Notice: Subject to any disclaimer, the term of this patent is extended or adjusted under 35 U.S.C. 154(b) by 0 days.

(21) Appl. No.: 17/344,492

(22) Filed: Jun. 10, 2021

(65) Prior Publication Data

US 2022/0398563 A1 Dec. 15, 2022

(51) Int. Cl.
| | | |
|---|---|---|
| *H04W 4/80* | (2018.01) | |
| *G06Q 20/32* | (2012.01) | |
| *G06V 20/10* | (2022.01) | |
| *H04W 4/02* | (2018.01) | |

(52) U.S. Cl.
CPC ....... *G06Q 20/327* (2013.01); *G06Q 20/3224* (2013.01); *G06V 20/10* (2022.01); *H04W 4/023* (2013.01); *H04W 4/80* (2018.02)

(58) Field of Classification Search
CPC ... G06Q 20/327; G06Q 20/3224; H04W 4/80; H04W 4/023; G06K 9/00664
USPC ........................................................ 455/41.2
See application file for complete search history.

(56) References Cited

U.S. PATENT DOCUMENTS

| | | | | |
|---|---|---|---|---|
| 9,171,433 | B1* | 10/2015 | Kliegman | G08B 13/1427 |
| 10,163,107 | B1* | 12/2018 | White | G06Q 20/341 |
| 10,482,440 | B1* | 11/2019 | White | G07G 1/0009 |
| 10,878,405 | B2* | 12/2020 | Seal | G06K 7/0013 |
| 10,972,911 | B2* | 4/2021 | Lerch | G01S 5/14 |
| 11,010,044 | B2* | 5/2021 | Sartori | G06Q 20/4012 |
| 11,029,755 | B2* | 6/2021 | Wade | G06F 3/011 |
| 11,064,047 | B1* | 7/2021 | Stegall | H04L 67/34 |
| 11,222,434 | B2* | 1/2022 | D'Souza | G06V 40/10 |
| 2006/0287783 | A1* | 12/2006 | Walker | H04Q 9/00 701/31.4 |
| 2009/0093272 | A1* | 4/2009 | Saarisalo | G06K 19/07345 455/558 |
| 2012/0016793 | A1* | 1/2012 | Peters | G06Q 20/352 705/39 |

(Continued)

OTHER PUBLICATIONS

Phillips, Tom, "Patent shows how Apple Pay could automatically select a card based on the user's location", downloaded from https://www.nfcw.com/2021/04/09/371612/patent-shows-how-apple-pay-could-automatically-select-a-card-based-on-the-users-location/; Apr. 9, 2021.

(Continued)

*Primary Examiner* — April G Gonzales

(74) *Attorney, Agent, or Firm* — Moffat & Co

(57) ABSTRACT

A method and computer system for detecting, utilizing at least one sensor associated with the computer system, an attempt to establish short-range communications between a device and a short-range communications module coupled to the computer system. The method and computer system further configured for determining that no short-range communication was received by the computer system via the short-range communications module and providing a signal to the device to enable a short-range communications transceiver at the device.

21 Claims, 7 Drawing Sheets

(56) References Cited

U.S. PATENT DOCUMENTS

| | | | | |
|---|---|---|---|---|
| 2014/0062695 | A1* | 3/2014 | Rosen | G08B 21/0219 340/539.13 |
| 2014/0113551 | A1* | 4/2014 | Krishnan | H04B 5/72 455/90.3 |
| 2014/0274031 | A1* | 9/2014 | Menendez | H04W 4/029 455/552.1 |
| 2014/0274225 | A1* | 9/2014 | Lacatus | H04W 52/0241 455/574 |
| 2015/0017914 | A1* | 1/2015 | Dua | H04M 1/0264 455/41.1 |
| 2015/0242665 | A1* | 8/2015 | Antonescu | G06K 19/0724 340/8.1 |
| 2015/0302456 | A1* | 10/2015 | Rego | G06Q 30/0235 705/14.35 |
| 2016/0174038 | A1* | 6/2016 | Menardais | H04L 67/75 340/539.11 |
| 2016/0321663 | A1* | 11/2016 | Batlle | G06Q 20/405 |
| 2017/0011401 | A1* | 1/2017 | Steinlicht | G06Q 20/405 |
| 2017/0115941 | A1* | 4/2017 | Kim | G06F 3/0488 |
| 2017/0118323 | A1* | 4/2017 | Kim | H04M 1/72412 |
| 2017/0270510 | A1* | 9/2017 | Kattimani | H04W 4/023 |
| 2018/0005465 | A1* | 1/2018 | Truong | G06Q 10/0833 |
| 2018/0263057 | A1* | 9/2018 | Yamashiro | H04W 4/44 |
| 2019/0087807 | A1* | 3/2019 | Choi | H04L 9/3226 |
| 2020/0302128 | A1* | 9/2020 | Rule | G06Q 20/352 |
| 2021/0019788 | A1* | 1/2021 | Chauhan | G06Q 30/0266 |
| 2022/0129881 | A1* | 4/2022 | DeFazio | G06Q 20/352 |
| 2022/0188797 | A1* | 6/2022 | Maan | G06Q 20/20 |

OTHER PUBLICATIONS

Extended European Search Report, EP Application No. 21169641.4, issued Oct. 13, 2021.

Non-Final Office Action, U.S. Appl. No. 17/344,458, mailed Sep. 2, 2022.

* cited by examiner

METHOD AND SYSTEM FOR ACTIVE NFC PAYMENT DEVICE MANAGEMENT

FIELD OF THE DISCLOSURE

The present disclosure is related to tap transactions utilizing short range communication technology, and in particular relates to short range communications system management for such contactless ("tap") transactions.

BACKGROUND

Many Point of Sale (POS) terminals now include the ability to receive a "tap" transaction, which is enabled through near field communications (NFC) technology. During such a transaction, the customer can bring an active payment mechanism, such as a mobile device, wearable such as a watch or the watch band, jewelry, among other options (referred to herein as a "transaction device"), into proximity with the NFC reader on the POS terminal. This will allow the POS terminal to receive information about the payment mechanism, as well as a response to a challenge.

However, in some cases, the NFC transceiver on the payment mechanism can be turned off during the transaction attempt. In this case, a typical POS terminal will have no information that a tap transaction was attempted, and will therefore present no failure notification to the customer. This can lead to customer frustration and delayed transaction time.

SUMMARY

In some cases, a transaction module at a computer system may not receive a response to a transaction message. For example, a transaction device such as a mobile phone, watch or other similar device may have the NFC transceiver turned off. In this case, a typical reader terminal will have no information that a tap transaction was attempted and will therefore present no failure notification to a user. This can lead to user frustration and delayed transaction time.

The subject-matter of the present application relates to manners in which failed tap transactions may be avoided in some embodiments, or detected and corrected in some embodiments.

In one aspect, a method at a computing system may include, detecting, utilizing at least one sensor associated with a computer system, an attempt to establish short-range communications between a device and a short-range communications module coupled to the computer system; determining that no short-range communication was received by the computer system via the short-range communications module; and providing a signal to the device to enable a short-range communications transceiver at the device.

In some embodiments, the method may further include determining that the device has a short-range communications transceiver.

In some embodiments, the determining that the device has the short-range communications transceiver may include using the at least one sensor associated with the computer system to identify a device type for the device.

In some embodiments, the at least one sensor may comprise a camera and the determining may use image recognition to identify the device type.

In some embodiments, the providing the signal may comprise identifying a destination associated with the device; and sending the signal to the identified destination, the signal including an instruction to activate the active-mode short range communications transceiver.

In some embodiments, the identifying the destination may comprise correlating an input to the computer system by a user associated with the device and a database of destinations.

In some embodiments, the input may comprise at least one of: a username; telephone number; email address; and a customer loyalty card input.

In some embodiments, the input may comprise biometric data obtained from at least one sensor associated with the computer system.

In some embodiments, the providing the signal may comprise sending a broadcast message with instructions embedded therein, the instructions causing the device to activate the active-mode short range communications transceiver.

In another aspect, computer system may be provided. The computer system may comprise a processor; and a communications subsystem and may be is configured to: detect, utilizing at least one sensor associated with the computer system, an attempt to establish short-range communications between a device and a short-range communications module coupled to the computer system; determine that no short-range communication was received by the computer system via the short-range communications module; and provide a signal to the device utilizing the communications subsystem to enable a short-range communications transceiver at the device.

In some embodiments, the computer system may further be configured to determine that the device has a short-range communications transceiver.

In some embodiments, the computer system may further be configured to determine that the device has the short-range communications transceiver by using the at least one sensor associated with the computer system to identify a device type for the device.

In some embodiments, the at least one sensor may comprise a camera and wherein the computer system is configured to determine by using image recognition to identify the device type.

In some embodiments, the computer system may be configured to provide the signal by identifying a destination associated with the device; and sending the signal to the identified destination, the signal including an instruction to activate the active-mode short range communications transceiver.

In some embodiments, the computer system may be configured to identify the destination by correlating an input to the computer system by a user associated with the device and a database of destinations.

In some embodiments, the input may comprise at least one of: a username; telephone number; email address; and a customer loyalty card input.

In some embodiments, the input may comprise biometric data obtained from at least one sensor associated with the computer system.

In some embodiments, wherein the computer system may be configured to provide the signal by sending a broadcast message with instructions embedded therein, the instructions causing the device to activate the active-mode short range communications transceiver.

In another aspect, a non-transitory computer readable medium for storing instruction code is provided. The instruction code, when executed by a processor of a computer system, may cause the computer system to: detect, utilizing at least one sensor associated with the computer system, an attempt to establish short-range communications between a device and a short-range communications module coupled to the computer system; determine that no short-range communication was received by the computer system via the short-range communications module; and provide a signal to the device utilizing the communications subsystem to enable a short-range communications transceiver at the device.

In some embodiments, the instruction code, when executed by the processor, may further cause the computer system to determine that the device has a short-range communications transceiver.

In another aspect, a computer-implemented method is provided. The method may include determining, using a first receiver of a device, that a defined condition exists; and responsive to determining that the defined condition exists, activating a short-range transceiver system of the device, wherein the short-range transceiver system is different from the first receiver.

In some embodiments, the short-range transceiver system may be used for short-range communication between the device and a short-range communications module coupled to a computer system.

In some embodiments, the defined condition may comprise a location for the device being within a threshold distance from at least one short-range communications module on a list of short-range communications modules.

In some embodiments, the list of short-range communications modules may be dynamically updated at the device based on a communication from a server.

In some embodiments, the defined condition comprises a location for the device being within a defined geofence associated with at-least one short-range communication module.

In some embodiments, the activating may comprise sending a message from a location determining application at the device to an application controlling the short-range transceiver system to activate the short-range transceiver system.

In some embodiments, the defined condition may comprise receipt at the device of a beacon signal associated with at least one short-range communication module.

In some embodiments, the activating may comprise sending a message from a first application at the device to an application controlling the short-range transceiver system to activate the short-range transceiver system.

In some embodiments, determination that the defined condition exists may comprise capturing an image by the device; and analyzing the image to determine whether a defined visual element is found within the image.

In some embodiments, the activating may comprise sending a message from an image processing application at the device to an application controlling the short-range transceiver system to activate the short-range transceiver system.

In some embodiments, the method may further comprise determining that the defined condition no longer exists; and deactivating the short-range transceiver system.

In another aspect, a device comprising a processor; a first receiver; and a short-range transceiver system may be provided. The device may be configured to: determine, using the first receiver of a device, that a defined condition exists; and responsive to determining that the defined condition exists, activate the short-range transceiver system of the device, wherein the short-range transceiver system is different from the first receiver.

In some embodiments, the short-range transceiver system may be used for short-range communication between the device and a short-range communications module coupled to a computer system.

In some embodiments, the defined condition may comprise a location for the device being within a threshold distance from at least one short-range communications module on a list of short-range communications modules stored at the device.

In some embodiments, the list of short-range communications modules may be dynamically updated at the device based on a communication from a server.

In some embodiments, the defined condition comprises a location for the device being within a defined geofence associated with at-least one short-range communication module.

In some embodiments, the device may be configured to activate by sending a message from a location determining application at the device to an application controlling the short-range transceiver system to activate the short-range transceiver system.

In some embodiments, the defined condition may comprise receipt at the device of a beacon signal indicating the active-mode short range transceiver system should be activated.

In some embodiments, the device may be configured to activate by sending a message from a first application at the device to an application controlling the short-range transceiver system to activate the short-range transceiver system.

In some embodiments, determination that the defined condition exists may comprise capturing an image by the device; and analyzing the image to determine whether a defined visual element is found within the image.

In some embodiments, the device may be configured to activate by sending a message from an image processing application at the device to an application controlling the short-range transceiver system to activate the short-range transceiver system.

In some embodiments, the device may further be configured to: determine that the defined condition no longer exists; and deactivate the short-range transceiver system.

In another aspect, a non-transitory computer readable medium for storing instruction code may be provided. The instruction code, when executed by a processor of a device, may cause the device to determine, using a first receiver of a device, that a defined condition exists; and responsive to determining that the defined condition exists, activate a short-range transceiver system of the device, wherein the short-range transceiver system is different from the first receiver.

BRIEF DESCRIPTION OF THE DRAWINGS

The present disclosure will be better understood with reference to the drawings, in which.

DETAILED DESCRIPTION

Figure 1:
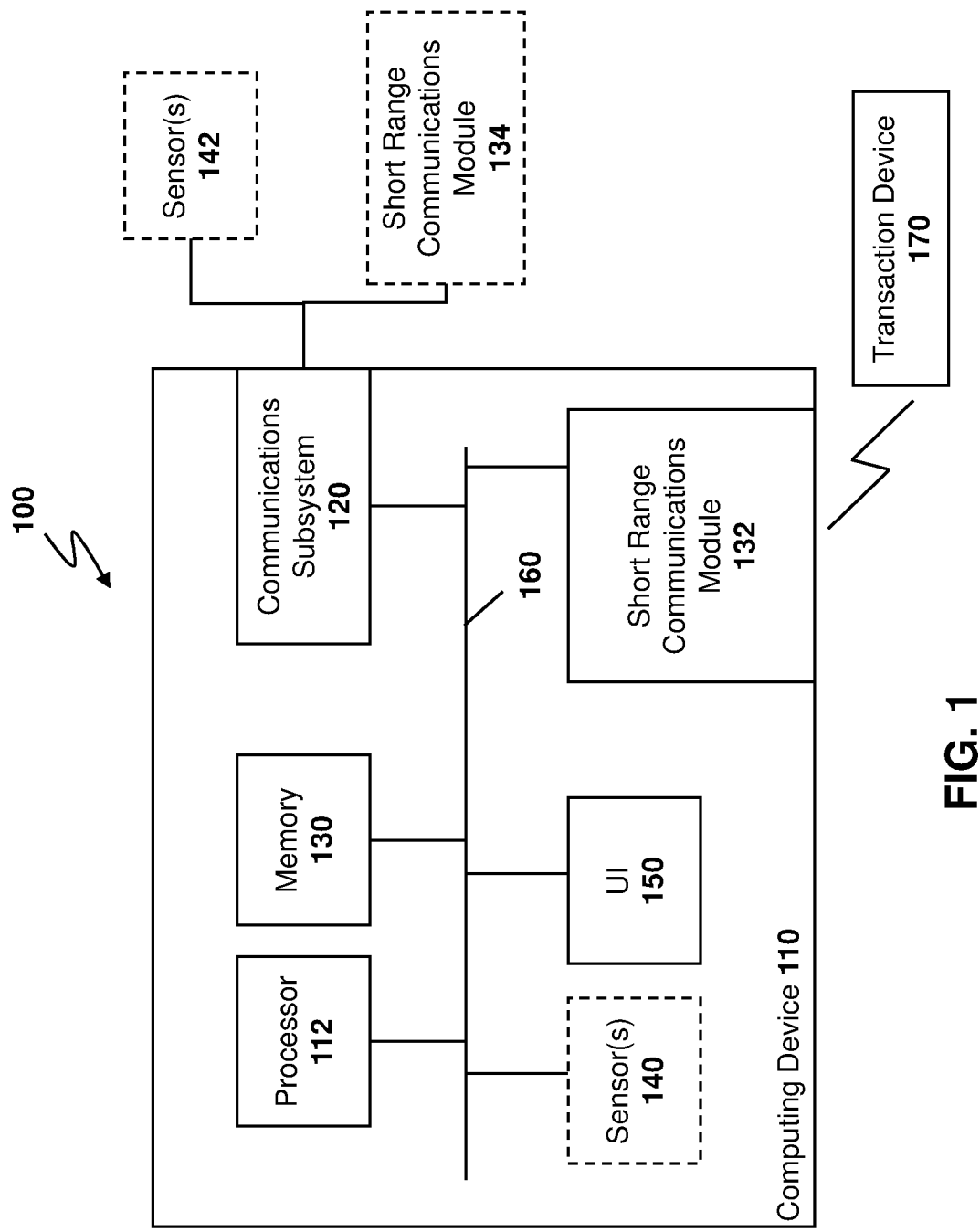
FIG. 1 is a block diagram showing an example computer system capable of being used with the embodiments of the present disclosure.

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

In accordance with various embodiments of the present disclosure, a computer system associated with a short-range communications module, such as a POS terminal, may utilize information from sensors (secondary sensors) outside of the short-range communications module to detect that a transaction attempt has been made, while determining that the short-range communications module associated with the computer system did not detect a transaction.

Based on/responsive to the detection of the transaction attempt while the short-range communications module associated with the computer system did not detect a transaction, the computer system could perform an action. Various actions may be performed, such as alerting a user that a transaction attempt failed, alerting third party users, providing a user with instructions to perform the transaction in a different way, instructing the user to perform a different type of transaction, among other actions. In accordance with one embodiment of the present disclosure, one action could be to provide a signal to a device that has a short-range communications transceiver to turn on or enable the short-range communications transceiver.

In accordance with the embodiments of the present disclosure, various short-range communication terminals could be utilized. In one example, a POS terminal may be used and the transaction that is being attempted is a payment transaction. However, this is not limiting and in other cases other short-range communication modules could be utilized. For example, a security system may have a short-range communication module associated with the door. In a particular example, a radio frequency identification (RFID) reader could be associated with a security system. In this case, the security system may also have another sensor such as, for example, a video camera pointed towards the door, which may be the secondary sensor that is utilized to provide an indication of a transaction attempt.

In other cases, other short-range communication technologies, including but not limited to NFC, RFID, Bluetooth™, Bluetooth Low Energy (BLE), Infrared Data Association (IrDA) readers, among others may be utilized.
Computer System Short-range communication modules may have additional sensors associated with such a module/with a device within which they are all integrated. For example, a POS terminal may be built on a reference computing device such as a mobile platform and have access to sensors such as a camera, a positional sensor such as an IR sensor, an accelerometer, among other options.

In other cases, the short-range communication module may be associated with a computing device such as a mobile device. For example, a payment terminal can be added to a mobile device, in some cases using a USB port or a Bluetooth™ chipset on the mobile device. In this case, the POS terminal may have access to the mobile device sensors.

In other cases, an RFID reader or similar sensor may be connected via wired or wireless means to a server or computing device.

In other cases, a short-range communications module may consist merely of a reader and other sensors may be associated with another computing device.

Therefore, reference is now made to FIG. 1, which shows an example, simplified, computing system 100. In the example of FIG. 1, a computing device 110 may include a processor 112 and a communications subsystem 120, where the processor 112 and the communications subsystem 120 cooperate to perform the methods of the embodiments described herein.

Processor 112 is a hardware processor configured to execute programmable logic, which may be stored, along with data, on computing device 110 and shown in the example of FIG. 1 as memory 130. Memory 130 can be any tangible, non-transitory computer readable storage medium such as optical (e.g., CD, DVD, etc.), magnetic (e.g., tape), flash drive, hard drive, or other memory known in the art.

Alternatively, or in addition to memory 120, computing device 110 may access data or programmable logic from an external storage medium, for example through communications subsystem 120.

Communications subsystem 120 allows computing device 110 to communicate with other devices or network elements and the design of communications subsystem 120 may be based on various types of communications being performed. Further, communications subsystem 120 may comprise a plurality of communication technologies, including any wired or wireless communication technology.

In the embodiment of FIG. 1, computing device 110 may include a short-range communications module 132. For example, computing device 110 may consist of a point-of-sale terminal NFC reader, an RFID reader, among other options. In the example of FIG. 1, short-range communications module 132 is internal to computing device 110. However, in other embodiments, the short-range communications module may be external to the computing device 110. For example, in the case that the short-range communications module is an add-on to the computing device 110, the short-range communications module may be external and may communicate through communications subsystem 120. This is shown in the embodiment of FIG. 1 as short-range communications module 134.

Further, other sensors may be associated with the computing device 110. Such sensors may be internal sensors, shown as sensors 140 in the embodiment of FIG. 1. In other cases, the sensors may be external and are shown as sensors 142 in the embodiment of FIG. 1. In certain circumstances, a combination of internal and external sensors may also be used with computing device 110 within computer system 100.

Sensors 140 or 142 may consist of various sensors that can be used to analyse whether a transaction attempt has been made. For example, in some cases, the sensors may comprise cameras or other image capture modules. In other cases, sensors may include proximity modules such as an IR detector, RADAR, LIDAR, among others. In still other situations, the sensors may include motion sensors such as passive infrared (PIR), microwave, ultrasonic, tomographic motion detectors, gesture detectors, among other options. In other cases, the sensors can include bump sensors such as accelerometers, pressure sensors, among others. In various circumstances, a plurality of sensors may exist and be associated with the computing system. Thus, a combination of the various types of sensors may be available within the computing system.

In the embodiment of FIG. 1, computing device 110 further includes a user interface (UI) 150. However, UI 150 is an optional element. The user interface 150 can be any auditory, visual or a haptic feedback mechanism to provide a user with information. For example, user interface 150 could be a display screen, light, speaker, vibration mechanism, among other options.

However, in some cases, in addition to or rather than, the user interface 150 being associated with computing device 110, a user interface could be associated with an external short-range communications module 134. For example, on an RFID door reader, the user interface may be a light that turns green when entrance is permitted and red when a transaction failure detection is made.

Communications between the various modules within a computing device can be done in a variety of ways. In the example of FIG. 1, a bus 160 is shown to allow communications between the various modules. However, this is merely provided for illustration purposes and other types of communication between modules is possible.

In operation, a transaction device 170 may be brought into proximity with the short-range communications module 132 in order to have information stored on, or derived by, transaction device 170 transmitted to the short-range communications module 130. For example, transaction device 170 may be any payment token or any other type of fob. For example, the transaction device 170 may be a watch, watchband, mobile device such as a smart phone, jewelry, among other such devices as may be equipped with short-range communications hardware (e.g., an NFC transceiver).

In other cases, short range communications module 132 may be an RFID reader and the transaction device may be a fob with the corresponding RFID technology. In this case, the short-range communications module 132 may issue a challenge to the transaction device 170 which will then be responded to from the transaction device 170. The short-range communications module 132 can then compare the results from the challenge with the expected results in order to determine whether to accept the transaction or not.

In still further cases, transaction device 170 can be any short-range communications device capable of interacting with the short-range communications module 130.

In the embodiments of the present disclosure, transaction device 170 includes a short-range communications transceiver that can be turned on or off. For example, transaction device 170 may be a smartphone that has an NFC transceiver. For security or battery savings reasons, among other examples, a user of the smartphone may be able to turn off the NFC transceiver. In other cases, other short-range communications transceivers could similarly be turned on or off in accordance with the embodiments of the present disclosure.

Figure 2:
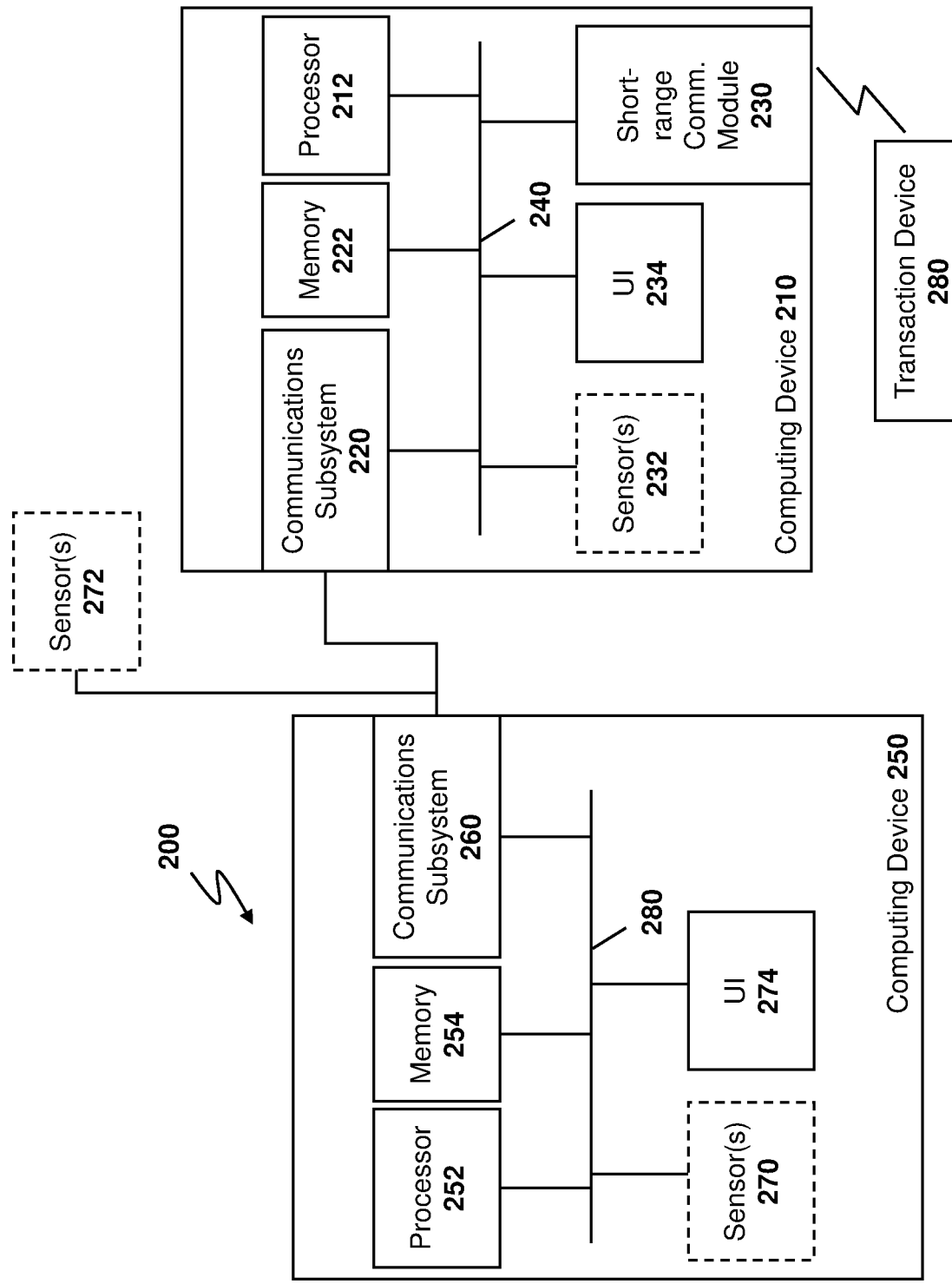
FIG. 2 is a block diagram showing a further example computer system capable of being used with the embodiments of the present disclosure.

While the embodiment of FIG. 1 shows a single computing device with internal or external sensors and/or internal or external short-range communications modules, in other cases, a plurality of computing devices may exist within a computer system. Reference is now made to FIG. 2.

In the example of FIG. 2, a simplified computing system 200 having a first computing device 210 and a second computing device 250 is shown. In particular a computing device 210 may be associated with a short-range communications module and be similar to computing device 110 from FIG. 1. Computing device 210 includes a processor 212 and a communications subsystem 220, where the processor 212 and the communications subsystem 220 cooperate to perform the methods of the embodiments described herein.

Processor 212 is a hardware processor configured to execute programmable logic, which may be stored, along with data, on computing device 210 and shown in the example of FIG. 2 as memory 222. Memory 222 can be any tangible, non-transitory computer readable storage medium such as optical (e.g., CD, DVD, etc.), magnetic (e.g., tape), flash drive, hard drive, or other memory known in the art.

Alternatively, or in addition to memory 222, computing device 210 may access data or programmable logic from an external storage medium, for example through communications subsystem 220.

Communications subsystem 220 allows computing device 210 to communicate with other devices or network elements and the design of communications subsystem 220 may be based on various types of communications being performed. Further, communications subsystem 220 may comprise a plurality of communication technologies, including any wired or wireless communication technology.

In the embodiment of FIG. 2, computing device 220 may have a short-range communications module 230. For example, this may consist of a point-of-sale terminal NFC reader, an RFID reader, among other options. In the example of FIG. 2, short-range communications module 230 is internal to computing device 210. However, in other embodiments, the short-range communications module may be external to the computing device 210.

Further, other sensors may be associated with the computing device 210. Such sensors may be internal sensors, shown as sensors 232 in the embodiment of FIG. 2. In other cases, the sensors may be external to the computing device. In certain circumstances, a combination of internal and external sensors may also be used with computing device 210.

Sensors 232 may consist of various sensors that can be used to analyse whether a transaction attempt has been made. For example, in some cases, the sensors may comprise cameras or other image capture modules. In other cases, sensors may include proximity modules such as an IR detector, RADAR, LIDAR, among others. In still other situations, the sensors may include motion sensors such as passive infrared (PIR), microwave, ultrasonic, tomographic motion detectors, gesture detectors, among other options. In other cases, the sensors can include bump sensors such as accelerometers, pressure sensors, among others. In various circumstances, a plurality of sensors may exist and be associated with the computing system. Thus, a combination of the various types of sensors may be available within the computing system.

In one embodiment of FIG. 2, computing device 210 further may include a user interface (UI) 234. The user interface 234 can be any auditory, visual or a haptic feedback mechanism to provide a user with information. For example, user interface 234 could be a display screen, light, speaker, vibration mechanism, among other options. However, in some cases, user interface 234 is optional.

Communications between the various modules within the computing device 210 can be done in a plurality of ways. In the example of FIG. 2, a bus 240 is shown to allow communications between the various modules. However, this is merely provided for illustration purposes and other types of communication between modules is possible.

Further, in the embodiment of FIG. 2, a second computing device 250 is provided. Computing device 250 may be an external computing device that is somehow associated with the computing device 210. For example, computing device 250 may be a computing device for an operator, including a mobile device or tablet that is somehow associated with a stand-alone point-of-sale terminal. In other examples, computing device 250 may be a network server that is used to perform the processing or is provided as a backend for a particular computing system. For example, in some cases, computing device 250 may be used to perform image processing. In other cases, computing device 250 may be a security system computing device associated with security staff. Other examples are possible.

As with computing device 210, computing device 250 may include a processor 252 and a communications subsystem 260, where the processor 252 and communications subsystem 260 cooperate to perform the methods of the present disclosure.

Processor 252 may use programmable logic to execute instructions stored in a memory 254. Further memory 254 may store other data and may be any non-transitory computer storage medium.

In some embodiments, such sensors may be similar to sensors 140 or sensors 142 from the embodiment of FIG. 1.

Further, in some cases computing device 250 may include a user interface 274 which may be used to provide visual, auditory or haptic feedback to a user of computing device 250. In this case, the user of computing device 250 may be different from the user trying to complete the transaction. For example, in some cases the user of computing device 250 may be a security staff member for a building that may receive information that an individual is unsuccessfully attempting to gain access to a door. Other examples are possible.

In the embodiment of FIG. 2, communications between various modules are provided using bus 280. Again, communications between modules can be done in a variety of ways and this is merely provided for illustration.

Communications between computing device 210 and computing device 250 may occur through various mechanisms. For example, communications subsystem 220 may communicate with communications subsystem 260 through a wired or wireless connection such as ethernet, Bluetooth, Wi-Fi, USB, other serial port, among others. In other cases, communications subsystem 220 may communicate through a network such as, for example, the Internet, among other similar options, with communications subsystem 260. In this case, each of communications subsystems 220 and 260 may use wired or wireless communications to communicate with a router which may then route the communications over such a network. Such communications may include but are not limited to cellular, satellite, Wi-Fi, among others.

In operation, a transaction device 280 such as a mobile device, watch, fob, among others may be brought into proximity of the short-range communications module 230 in order to have information stored on, or derived by, transaction device 280 transmitted to the short-range communications module 230. Transaction device 280 may be any of the transaction devices described with regards to transaction device 170 of FIG. 1.

Therefore, in one example transaction, if computing device 210 is a point-of-sale terminal, once transaction device 280 is brought into proximity with the point-of-sale terminal, the sensors 232, 270 and/or sensors 272 may detect a transaction attempt. However, short range communications module 232 may not detect a transaction attempt. In this case, the processor may utilize communication subsystem 220 to send the raw images to computing device 250, which may then use processor 252 to perform image processing or object detection to characterize the transaction attempt.

In some cases, results may then be sent, utilizing communications subsystem 260 back to the computing device 210 which may then, in accordance with the embodiments described below, utilize processor 212 to perform an action. For example, the action may be a signal sent to transaction device 280 or to a user associated with transaction device 280 to enable a transceiver associated with the short-range communications system on transaction device 280.

In other cases, a signal may be sent to transaction device 280 or to a user associated with transaction device 280 directly from computing device 250.

In a second example transaction, computing device 210 may be a key fob monitoring system for a door or doors in a facility. Computing device 250 may be a general security system associated with a company and may or may not be located in the same location as computing device 210. In this case, the short-range communication module 230 is an RFID reader and the transaction device 280 may be a mobile device. Sensors 232 may include proximity sensors which may detect that something is being brought into proximity with the RFID reader. However, in this case, if no transaction is detected then processor 212 may provide this information utilizing communications subsystem 220 to computing device 250. Computing device 250 may then, for example, obtain more information through sensors 270 which may include security cameras within the vicinity of the door on which the transaction attempt has been made. Information may be processed by processor 252 and instructions may, for example, be provided back through the communications subsystem 260 to computing device 210 to perform a particular action. For example, the action may be a signal sent to transaction device 280 or to a user associated with transaction device 280 to enable a transceiver associated with the short-range communications system.

In other cases, a signal may be sent to transaction device 280 or to a user associated with transaction device 280 directly from computing device 250.

Other options are possible.

In some cases, the embodiments of FIG. 1 of FIG. 2 could be combined, or more or fewer computing devices could be included in a computer system. The present disclosure is not limited to the embodiments of FIGS. 1 and 2, which are provided to illustrate examples of various computing systems.

Detecting Transaction Attempts

Utilizing a computer system such as those described above with regard to FIGS. 1 and 2, secondary sensors can be used to determine whether or not a transaction attempt has been attempted, even when the short-range communications module does not receive any input. Such detection can be used to, in some embodiments of the present disclosure, provide a signal either to a transaction device or a user to enable a short-range communication transceiver on the transaction device.

Figure 3:
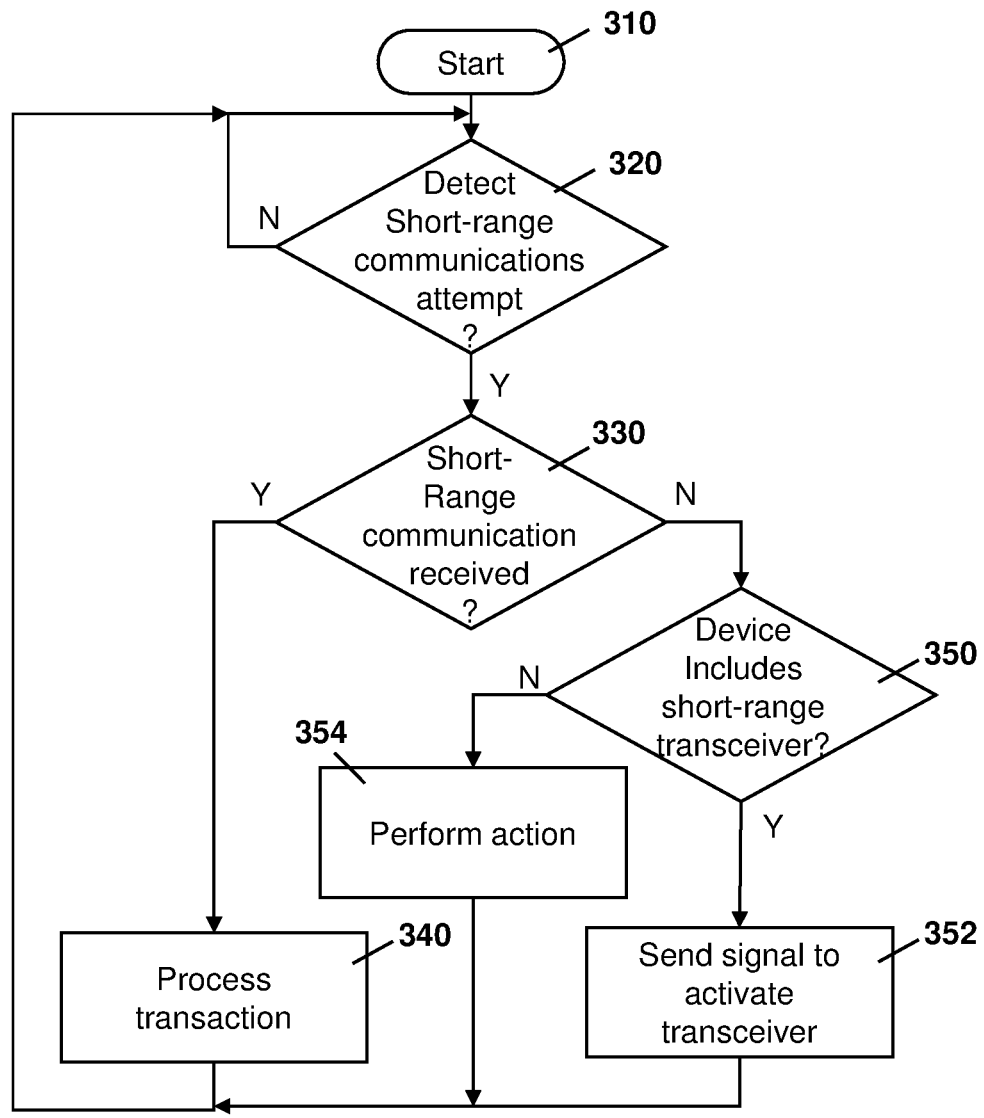
FIG. 3 is a process diagram showing a method for detecting a transaction attempt and sending a signal.

Reference is now made to FIG. 3. In the embodiment of FIG. 3 the process starts at block 310 and proceeds to block 320 in which a check is made to determine whether a short-range communication attempt is detected. The detection at block 320 utilizes sensors other than the short-range communications sensor.

For example, in a payment transaction utilizing a mobile device and an NFC reader, front facing cameras can use object recognition to determine when a device is being moved in front of the display indicating a payment attempt. In some cases, the cameras and image processing may also detect the withdrawal of the device away from the front of the display and back towards a user, further providing proof that a transaction attempt was made. Therefore, in some embodiments the camera could detect the motion of the device both towards the NFC reader and also away from the reader.

In other cases, security cameras in a hallway and image processing at a computer system may detect a user approaching a door and then attempt to swipe or tap a device on an RFID reader. In this way, an indication of an attempt to unlock the door may be detected. Notably, the attempt may be detected even if the RFID reader does not detect the attempt/receive any transmission from the device (e.g. due to a short-range transceiver on the device being inactive/off).

In other cases, Infrared (IR) or proximity sensors could be used to detect the proximity of a payment object (such as a mobile device, watch, watch band, jewelry, etc.) and a computer system can then detect that a payment transaction attempt has been made. Notably, in this way, a transaction attempt may be detected despite (e.g., even if) a wireless receiver (e.g., an NFC payment reader) does not receive any signal from the payment object.

In other cases, accelerometers or pressure sensors associated with the short-range communications module could detect movement or interaction with the module, and equate such movement as having a similar profile to a payment transaction attempt.

In other cases, microphones could detect the sound of the tap of a payment object against a display or NFC reader, and equate such sound with a transaction attempt. Notably, in this way, a transaction attempt may be detected despite (e.g., even if) a wireless receiver (e.g., an NFC payment reader) does not receive any signal from the payment object.

The detection of the short-range communication attempt by the processor of the computer system could utilize a variety of techniques. In some cases, the mere detection of an object would indicate a transaction attempt. Thus, the determination is a binary determination of whether the object is detected or not.

In other cases, the detection of the object could be a motion profile which may be compared with stored motion profiles in a database of the computer system.

In other cases, a communications module associated with the computer system may detect an electronic device in proximity to the reader. For example, while the reader may use NFC technology for the transaction, a communications module may further include a Bluetooth or Bluetooth Low Energy reader and may detect signals from the transaction device, even if the NFC transceiver is turned off.

In other cases, machine learning can be used to train a decision engine of a neural network using typical transaction attempts. Once a sensor detects an object, the decision engine could then determine whether a transaction attempt is ongoing.

In some cases, processing algorithms could define a confidence/probability that a transaction attempt is detected based on sensor readings and a threshold confidence/probability may be needed to positively detect the short-range communication attempt. For example, there may be a greater confidence depending on the clarity of a camera reading and whether the action is consistent with a transaction attempt. If a camera angle is blocked or partially blocked, this may for example lower the confidence/probability score. Additionally or alternatively, confidence may be higher if a sensor that is considered more reliable in detecting transaction attempts detects signals consistent therewith. Additionally or alternatively, analysis of the output of a given sensor may detect a transaction attempt with some confidence depending on the nature of the signal.

The confidence threshold, in some cases, may be configurable, for example by a system administrator or owner of a system.

Further, if multiple perceived transaction attempts are detected, this could further increase the confidence/probability that a threshold attempt is detected.

Other types of algorithms are also possible.

If a plurality of sensors is available to the computer system, then a correlation between the different sensors could be used to make the determination of whether a short-range communications attempt was detected at block 320. In this case, processing algorithms could define a confidence/probability that a transaction attempt is detected based on the sensors and a threshold confidence/probability may be needed to positively detect the short-range communication attempt. For example, there may be a greater confidence if a greater number of sensors detect signals consistent with a transaction attempt. Additionally or alternatively, confidence may be higher if one or more sensors considered more reliable in detecting transaction attempts detect signals consistent therewith. Additionally or alternatively, analysis of the output of a given sensor may detect a transaction attempt with some confidence depending on the nature of the signal. For example, where analysis of captured images is employed in detecting a transaction attempt, the confidence in there having been an attempt may vary based on the proximity of "transaction-like" movements (i.e., movements consistent with a transaction attempt such as by a user) to a reader.

The above examples of detection algorithms are by way of example only. Other detection algorithms are possible without departing from the subject matter of the present disclosure.

From block 320, if no short-range communication attempt is detected, the process continues to loop back to block 320 to continue to monitor for a short-range communication attempt detection.

Once a short-range communication attempt is detected at block 320, the process proceeds to block 330 in which a check is made to determine whether a short-range communication was received, as detected by the short-range communication module. Thus, in a payment transaction, the NFC reader could determine whether an NFC communication was received at the NFC reader. For an RFID transaction, the RFID reader could determine if the RFID communication was received. Similarly, other short-range communications techniques could be detected at the short-range communication module. In some cases, the check at block 330 could occur before the check at block 320.

From block 330, if a short-range communication was received, this indicates that a transaction is being attempted and the process may proceed to block 340 in which the transaction may be processed in standard ways. For example, if the transaction is a payment transaction, credit card information, along with the challenge response, can be processed and a communications path established between the computer system and a transaction clearinghouse to determine whether the funds will be transferred. For an RFID transaction, the response to a challenge can be compared with the expected response and if the two match, a door may be unlocked. In other cases, other types of transactions utilizing short-range communications could be enabled based on whether the standard validation for such transaction exists.

Conversely, if no short-range communication was received by the short-range communication module, as determined at block 330, then the process may proceed to block 350 in which an optional check may be performed to attempt to detect the type of transaction device. In particular, the check at block 350 could be used to determine whether the transaction device includes a short-range communications transceiver that can be turned on or off. This could be done in various ways.

In one case, the check at block 350 could use sensor information from the sensors associated with the computing device to determine the type of transaction device. For example, images from image capture devices could be checked, and image recognition algorithms used to determine a transaction device type. Thus, a watch or smartphone with an NFC transceiver capable of being turned on or off could be distinguished from a credit card with a passive NFC receiver.

In other cases, the images could be processed for movements indicative of a transaction device having a transceiver capable of being turned on or off. For example, the motion to tap a watch to a reader is different than the movement to tap a passive NFC device such as a credit card to the reader. A user's hands may be positioned differently on a smartphone that is being tapped than they would be on a passive key fob. Other such examples are possible.

In some cases, beacons transmitted by the transaction device could be used to determine a type of transaction device. Thus, if a WiFi, Bluetooth, or Bluetooth Low Energy beacon, among other options, is detected by the computing system, this may indicate that the device has a short-range communication transceiver capable of being turned on or off.

In other cases, a combination of sensors may be used to determine a type of transaction device. Thus, images from various cameras could be combined, or cameras and beacon signals detected could be correlated, among other options.

In some cases, processing algorithms could define a confidence/probability that a transaction device has a transceiver capable of being turned on or off, and a threshold confidence/probability may be needed to positively determine the transaction device type. For example, there may be a greater confidence depending on the clarity of a camera reading and whether the action or movement is consistent with certain types of devices. If a camera angle is blocked or partially blocked, this may for example lower the confidence/probability score. Additionally or alternatively, confidence may be higher if a sensor that is considered more reliable in detecting transaction attempts detects signals consistent therewith. Additionally or alternatively, analysis of the output of a given sensor may detect a device type with some confidence depending on the nature of the signal.

From block 350, if the device is detected to have a transceiver that is capable of being turned on or off, the process proceeds to block 352.

Further, the determination at block 350 is optional in some cases and the process may proceed directly from block 330 to block 352 in these cases. For example, in some embodiments it may be deemed unnecessary to determine whether the device has an active NFC or other short-range communications transceiver, and rather it is assumed that such device has a transceiver capable of being turned on or off and the process of block 352 may be performed.

In other cases, secondary indications may be enough to have the process proceed directly from block 330 to block 352. For example, in some cases a user may be identified to the system in some way, and a user profile may indicate that the user uses a payment device having a transceiver capable of being turned on or off. For example, the user may be identified by tapping or swiping a loyalty card prior to the payment transaction and this can be used to identify the user. In other cases, facial recognition can be used to identify a user. In other cases, the user may have input credentials into a keypad prior to the transaction. Other options are possible.

A lookup for historic payments for such user, or a lookup for user preferences, could then identify whether the user uses a payment device having a transceiver that can be turned on or off.

At block 352 a signal may be sent to a transaction device or a user associated with the transaction device in order to have the transceiver on the transaction device turned on. Specifically, if a transaction attempt has been detected but no signal has been received, the transceiver of the payment device may be turned off and therefore the signal sent at block 352 may be used to activate the transceiver to allow the transaction to be re-attempted.

Such signal could take various forms. In a first case, the user of the transaction device may be identified at the computing device. For example, the user may have swiped a loyalty card, entered a phone number or email into a Point of Sales (POS) terminal, be identified through biometric means such as facial recognition, among other methods. This identification may provide a way to communicate with the transaction device using a database lookup for customer contact information, and a message, such as a specially coded text message or email, or a communication to an application on the transaction device, may be sent. For example, a destination for the signal may be found, and may include things like: a phone number (e.g. send SMS), an application identity (e.g. send a push notification to a specific application), an email address (e.g. send an email), and in some embodiments a hardware address of the device itself.

Figure 4:
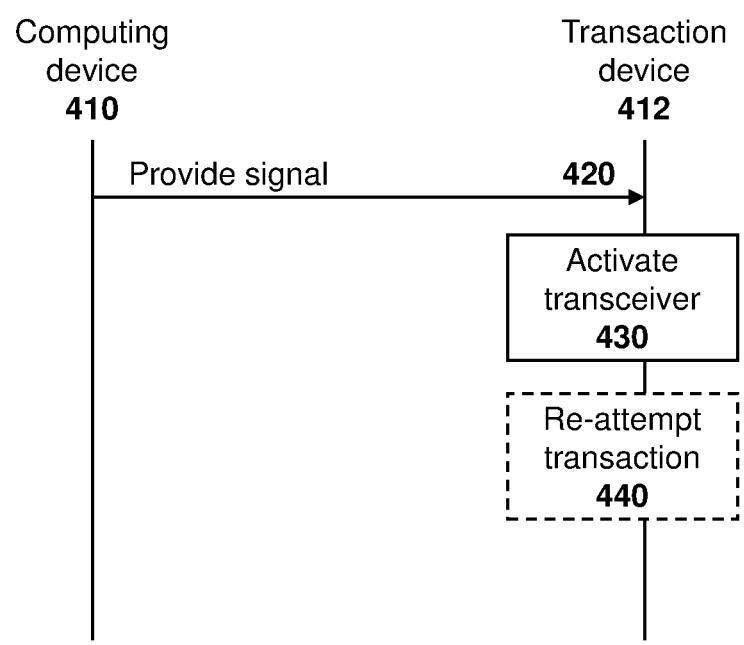
FIG. 4 is a dataflow diagram showing the activation of a transceiver on a transaction device.

Referring to FIG. 4, the computing device 410 may send a signal to transaction device 412, as shown with message 420. The message may be received by the transaction device 412 and may contain instructions to activate the short-ranged communications transceiver. An application receiving the communication would request an application associated with the NFC (or other short-range communication) antenna, to activate such antenna (transceiver), as shown at block 430. This would then allow the transaction to proceed, for example by re-attempting the transaction as shown at block 440.

In other cases, at block 352 of FIG. 3, where customer information is not available, the signal could take the form of a broadcast message. For example, a Bluetooth beacon could have information inserted therein, which, when detected by the transaction device, would signal to the transaction device to turn on the short-range communications antenna. In other cases, the broadcast could use Wi-Fi, cellular, Bluetooth Low Energy or other communications technologies that the active NFC device could receive and act on. For example, an identifier associated with the signal could trigger the device, on detection of the signal with the identifier, to activate the NFC transceiver.

Therefore, in the embodiment of FIG. 4, message 420 could include information embedded in a broadcast from computing device 410. At block 430 the transaction device would receive such message and act on the message to activate a transceiver. For example, an application on the device could listen for information in the broadcast and act on such information by requesting an application associated with the NFC antenna to activate the antenna.

In some cases, rather than directly turning on the transceiver, the signal sent at block 352 may cause a message to be provided to the user of the transaction device. For example, a message may be displayed on a user interface of a transaction device indicating that the short-range communications antenna is not turned on. Such message may, in some cases, allow a user to activate the transceiver from within the message. For example, a message may be "Transaction attempt detected—your NFC is off. Do you want to turn NFC on?", with a button for yes and no.

In some cases, rather than a visual message, an auditory or haptic message may be provided on the transaction device indicating transaction failure. Such message may cause the user to activate the transceiver and re-attempt the transaction.

Referring again to FIG. 3, in some embodiments if it is detected at block 350 that the device does not include a short-range transceiver, the process could optionally proceed to block 354 in which an action is performed.

As described in U.S. patent application Ser. No. 17/081, 528, the action that is performed may be specific to the type of transaction that is being attempted. For example, in a payment transaction, in one case the action may include displaying on a display of the POS terminal an error message. For example, the message may be "Card Not Detected", or a similar message. This provides feedback to the customer that the transaction did not succeed and can allow the customer to make an alternative payment attempt, including, for example, using a different mechanism for payment with the same card/payment object such as swiping a magnetic strip or inserting a chip card in some cases, or using a different card/payment object in other cases.

In other cases, a message at the user interface of the computer system may affirmatively provide a customer with directions to use a different transaction mechanism, such as for example instructions to use a swipe reader or to insert the card into a contact reader.

In other cases, the action may be an audible signal, rather than, or in addition to, a visual message. For example, the audible signal could use a speaker associated with the POS terminal to either synthesize a voice or play a voice file indicating a transaction was not successful. In other cases, the audible signal can be any tone or noise distinct from the successful transaction noise that could indicate to the customer that the transaction was unsuccessful.

In other cases, the action may include haptic feedback, such as a vibration, to indicate an unsuccessful transaction attempt.

In other cases, the action may be a combination of the feedback mechanisms.

From block 340, block 352 or block 354, the process proceeds to block 320 to continue to detect short range communication attempts.

Based on the above, a computer system can use sensors other than a short-range communications sensor to detect a transaction attempt which is not registering with the short-range communications module. Based on such detection, the computer system can then provide a signal to a transaction device to activate a transceiver of a short-range communications system to allow the transaction to proceed. This may reduce user frustration with the system and/or speed of transactions.

Proactive Activation of Short-Ranged Communications Transceiver

While the embodiments described with regards to FIGS. 3 and 4 provide a reactive approach, where a failed transaction attempt is detected, in other embodiments a proactive approach could be taken prior to a transaction attempt.

Specifically, in some embodiments, a transaction device could, prior to the start of a transaction, receive a trigger condition using a first receiver, and based on the trigger condition, turn on the NFC antenna or other short-ranged transceiver.

Figure 5:
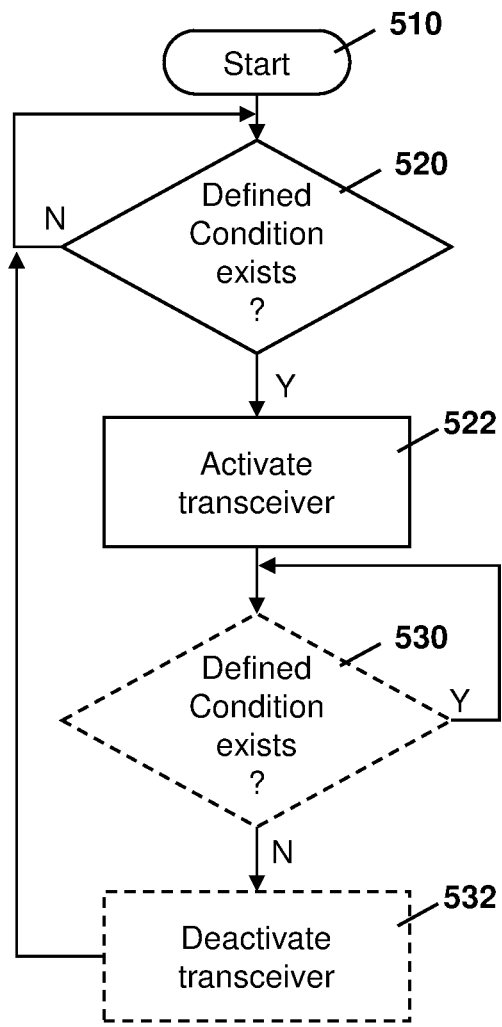
FIG. 5 is a process diagram showing a process for determining whether a defined condition exists and whether to activate a transceiver on a transaction device.

Reference is now made to FIG. 5. In the embodiment of FIG. 5, the process starts at block 510 and proceeds to block 520 in which a check is made at the transaction device to determine whether a defined condition exists.

In some cases, the defined condition could be the location of the device when correlated with a locations database for one or more POS terminals (or other types of transaction terminal such as an RFID reader, etc.). In this case, the first receiver is a Global Positioning System (GPS) receiver that could find the location of the transaction device. While the present disclosure utilizes GPS receiver as an example, any Global Navigation Satellite System (GNSS) receiver could be used. For example, such receivers may include receivers for Europe's Galileo system, Russia's Global'naya Navigatsionnaya Sputnikovaya Sistema (GLONASS) and China's BeiDou Navigation Satellite System, among other options.

Thus, if the device detects that it is within a threshold distance of a POS terminal, it could activate the short-ranged communications transceiver.

In one case, a server may maintain a list of point-of-sale terminals and their current location. For example, when a point-of-sale terminal is added to a storefront or removed from a storefront, the location of the point-of-sale terminal could be reported to the server. In other cases, where the point-of-sale terminal is mobile, the point-of-sale terminal could occasionally report its location to the server in order for the server to update its list of point-of-sale terminals and locations of such terminals. Thus, for example, a contractor that has a point-of-sale terminal associated with their smart phone could occasionally update the server on the location of such smart phone in order for the database to be updated.

In some cases, rather than a radius, the defined condition could be the location of the device relative to a geofenced area. For example, the first receiver could be a GNSS receiver, and the defined condition is that the device is within a geofence. A list of geofenced areas could be stored on the device or in a cloud or network server, and a check could be made to find whether the location of the device is within the boundaries of a geofenced area.

The server may provide the transaction device with updated locations of point-of-sale terminals or geofenced areas occasionally. In some cases, the updating may be based on the current location of the transaction device and the list of point-of-sale terminals could be tailored based on the location of the transaction device in order to reduce the amount of data needed to be transferred to the transaction device and the amount of data needed to be stored at the transaction device.

Various triggers could exist for the update at the transaction device. In some cases, the transaction device could request an update if it has moved more than a defined distance from where a previous update had occurred. In some cases, the transaction device could periodically report its location to the server and the server could use the location to determine whether to provide an update. In some cases, the server could periodically update the transaction device. In some cases, if a threshold number of point-of-sale terminals have either been introduced, removed, or moved from a previous update, this could trigger an update to the transaction device. In some cases, a combination of periodic updating and movement of the transaction device and/or movement or introduction of the point-of-sale terminals could be used. The database could therefore in some embodiments include dynamic mapping of POS terminals for location-based services.

In some cases, the point-of-sale terminals may be in a fixed or generalized location and the transaction device could store such locations in its memory without any updates from a server.

In some cases, the device location may be reported to a server to process whether the transaction device is within proximity to point-of-sale terminals or within geofenced areas, in which case the data may not need to be stored at the transaction device.

Other options are possible.

Therefore, in one embodiment, the check at block 520 could be a determination of whether the current location of the transaction device, as found using a GPS receiver, is within a threshold distance from a point-of-sale terminal as found in a list of point-of-sale terminals and their locations stored at the transaction device or at a network element. In one embodiment, rather than a threshold distance a geofenced area can be created around point-of-sale terminals, storefronts, or other locations.

In one embodiment, instead of a point-of-sale terminal, the list could include stores or buildings, and the determination at block 520 could be whether the current location of the transaction device is within a threshold distance of the store or building.

In another embodiment, the first receiver could be a radio receiver. For example, the radio receiver could be a cellular receiver, a Wi-Fi receiver, a Bluetooth receiver, a Bluetooth Low Energy receiver, an IrDA receiver, among other options.

In this embodiment a computing device associated with a store, building or business, or a computing device associated with a particular location within the store, building or business, or a POS or transaction terminal, among other options, could cause a broadcast or beacon signal to be transmitted. In some cases, the computing systems of FIG. 1 or 2 could be used.

The check at block 520 could therefore be whether a particular beacon or broadcast has been received at the transaction device.

For example, if the beacon or broadcast uses a technology that is limited in distance, such as Wi-Fi, Bluetooth, Bluetooth Low Energy (BLE), or IrDA, then the mere reception of the beacon could be an indication that the defined condition exists. The transaction device could store a list of identifiers, such as Medium Access Control (MAC) addresses for beacons that would cause the condition to be met. Such list could be updated periodically from a server in some embodiments. In some embodiments, the transaction device could update the list upon detecting a beacon and also detecting a failed transaction attempt, for example using the embodiments of FIGS. 3 and 4 herein. The beacon may be designed to cause transaction devices to turn on a short-range communications subsystem in some cases. In other cases the beacon may be for another purpose, but could still serve as an indication to the transaction device.

In some embodiments, information within the beacon or broadcast could be used to determine that the defined condition exists. For example, if looking for BLE broadcasts, part of a payload in a BLE beacon frame or BLE advertisement frame could provide a unique indication to an application on the transaction device that is monitoring the broadcasts or beacons, that the defined condition exists. Similar information could be provided in other radio technology broadcasts or beacons. This payload could include specific bits or bytes of the payload and/or information in a certain position within the beacon or broadcast frame, for example.

Therefore, the check at block 520 could be a determination of whether a particular beacon or broadcast is received, and/or whether information within the beacon or broadcast provides an indication that the defined condition exists.

In one embodiment, other conditions such as a camera on the transaction device detecting a POS terminal, transaction terminal, building or a store, could be used to find the defined condition exists at block 520.

For example, an image could be captured from the transaction device and based on image processing, an indication within the image could determine that the transaction device is within proximity of a transaction terminal.

For example, the image could be captured periodically in some cases. In some cases, the image could be captured based on other sensors at the transaction device, such as an accelerometer indicating that the device has changed states. For example, the accelerometer may be used to determine that the device is in a vehicle and when the vehicle stops an image may be captured. In other cases, rapid movement of the device could indicate that the device has been taken out of a pocket or purse and an image could be captured. Other options are possible.

In some embodiments, the captured image can be sent to a server or network element to do image processing. This would use a radio transceiver system such as a cellular or Wi-Fi radio to send the image and to receive results from image processing. In this case, the image processing could be used to determine whether any transaction terminal is detected within the frame, whether any signage for a store or business is detected within the frame, and/or whether the image looks like it is the inside of a store or business, among other options.

In some embodiments, the image processing could be performed by a processor on the transaction device.

In some cases, the image processing could find if a visual element such as an object, barcode, QR Code, or other such visual element is in the image.

Therefore, the check at block 520 could be a determination of whether an image capture device has captured an image indicating that a transaction terminal is nearby to the transaction device.

In some embodiments, the defined condition checked at block 520 could be a combination of conditions. In this case, the combination may use any logic between the individual conditions to determine whether the defined condition exists. For example, the defined condition may be that condition A and condition B both exist. In other cases, the defined condition may be that at least one of condition A and condition B exist. In other cases, the defined condition may be that condition A or condition B are satisfied, but that condition C must not be met. Other options for such logic are possible.

From block 520, if a determination is made that the defined condition does not exist, the process continues to loop to block 520.

Upon detection of the defined condition existing at block 520, the process proceeds from block 520 to block 522 in which a transceiver of the transaction device may be activated.

Figure 6:
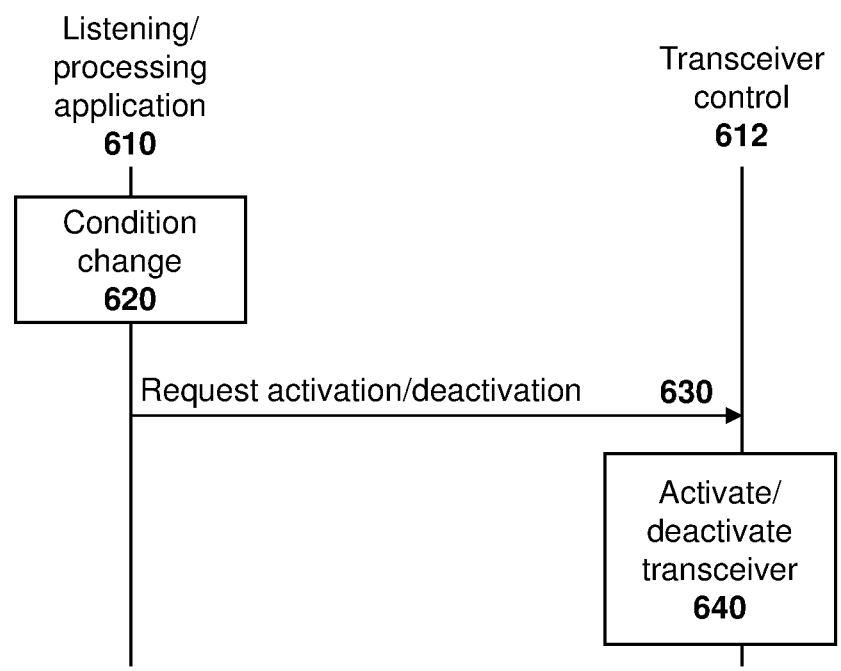
FIG. 6 is a dataflow diagram between a first application and a transceiver control application on a transaction device to activate or deactivate a transceiver.

For example, reference is now made to FIG. 6. In the embodiment of FIG. 6, a listening or processing application 610 may be configured to determine whether a condition has changed. For example, an application running on a transaction device such as a smartphone could be used to monitor whether a beacon channel has been received using a first receiver in some cases. In some cases, the application 610 may be a location application and use input from a GPS or other receiver to determine the location of the transaction device and compare such location with a list of locations. In other cases, the application 610 could be an application that is waiting for a server to provide an image processing result back from such server. In other cases, application 610 could be an image processing application that processes images from a camera on the transaction device. Other options for a listening or processing application 610 are possible.

Once a change in condition has been detected, the application 610 may request activation of the short-range communications transceiver as shown with message 630. As provided below, in some cases the application 610 may also request deactivation of the short-range communications transceiver in message 630.

On receiving message 630, a transceiver control application 612 may activate or deactivate the transceiver, depending on the content of message 630. This is done at block 640.

Referring again to FIG. 5, in an optional embodiment, the process proceeds from block 522 to block 530 to check whether the defined condition (or parts thereof if the defined condition is a combination of conditions) still exists. In particular, once the defined condition (or parts thereof) is no longer detected, the application on the transaction device may cause the short-range communication transceiver to turn off. In this way, security can be increased by not having the short-range communication transceiver on at all times, but only when a potential transaction is imminent. Further, in some embodiments the defined condition checked at block 530 could differ from the defined condition checked at block 520.

Specifically, at block 530, a check is made to determine whether a defined condition exists. If it still exists, the process continues to loop to block 530.

Once the defined condition no longer exists, the process proceeds from block 530 to block 532 in which the transceiver of the transaction device may be deactivated. This may be done, for example, by sending a message 630 from FIG. 6 to the transceiver control 612 to deactivate the transceiver.

From block 532, the process proceeds to block 520 to monitor whether the defined condition exists again.

Thus, the embodiments of FIGS. 5 and 6 take a proactive approach to activating a transceiver of a transaction device when such transaction device is in proximity to a transaction terminal such as a point-of-sale terminal. In an optional embodiment, the transceiver may be turned off once the transaction device has moved away from the transaction terminal.

Transaction device 170 or 280 could be implemented on any type of, or combination of, computing devices. For example, one simplified computing device that may perform the embodiments described herein is provided with regard to FIG. 7.

Figure 7:
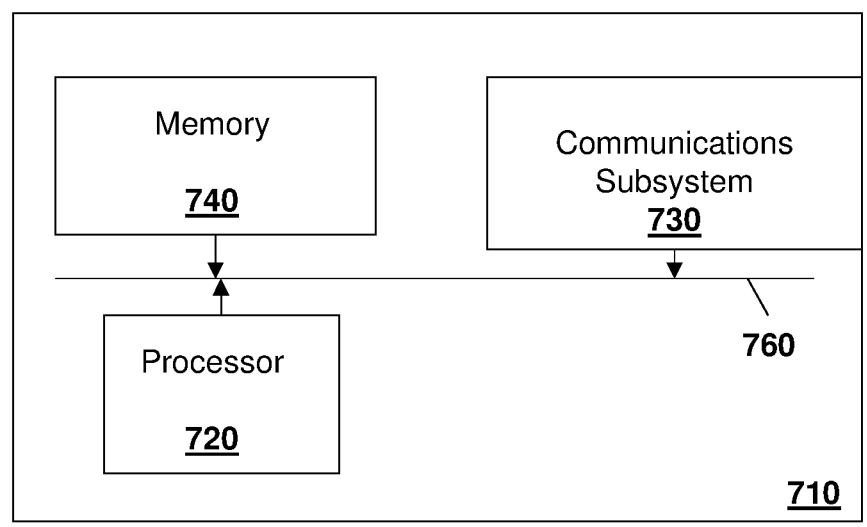
FIG. 7 is a block diagram of a simplified transaction device capable of being used with embodiments of the present disclosure.

In FIG. 7, computing device 710 includes a processor 720 and a communications subsystem 730, where the processor 720 and communications subsystem 730 cooperate to perform the methods of the embodiments described herein.

The processor 720 is configured to execute programmable logic, which may be stored, along with data, on the computing device 710, and is shown in the example of FIG. 7 as memory 740. The memory 740 can be any tangible, non-transitory computer readable storage medium, such as DRAM, Flash, optical (e.g., CD, DVD, etc.), magnetic (e.g., tape), flash drive, hard drive, or other memory known in the art. In one embodiment, processor 720 may also be implemented entirely in hardware and not require any stored program to execute logic functions. Memory 740 can store instruction code, which, when executed by processor 720 cause the computing device 710 to perform the embodiments of the present disclosure.

Alternatively, or in addition to the memory 740, the computing device 710 may access data or programmable logic from an external storage medium, for example through the communications subsystem 730.

The communications subsystem 730 allows the computing device 710 to communicate with other devices or network elements. In accordance with the embodiments of the present disclosure, communications subsystem 730 includes at least a short-range communication transceiver which can be used in a transaction, for example with the computing device 110 from FIG. 1 or computing device 210 from FIG. 2. In some embodiments, communications subsystem 730 further includes other receivers or transceivers, including, but not limited to, cellular radio transceiver, a Wi-Fi transceiver, a Bluetooth transceiver, a Bluetooth low energy transceiver, a GPS receiver, a satellite transceiver, an IrDA transceiver, among others. As will be appreciated by those in the art, the design of the communications subsystem 730 will depend on the type of communications that the transaction device is expected to participate in.

Further, in some embodiments, the communication subsystem 730 may include the capacity for wired communications, including, but not limited to, Ethernet, Universal Serial Bus (USB), among other options.

Communications between the various elements of the computing device 710 may be through an internal bus 760 in one embodiment. However, other forms of communication are possible.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method comprising:
   receiving a message, the message comprising at least one of a list of short-range communication modules or a geofence associated with at least one short-range communication module;
   receiving, using a first receiver of a transaction device capable of communicating with a reader device, an indication, the indication being indicative of the transaction device being at a location;
   responsive to receiving the indication, activating a short-range transceiver system of the transaction device by turning the short range transceiver system from an off state in which the antenna of the short range transceiver system is off and the short range transceiver system is inoperable for payment transactions to an on state in which the antenna of the short range transceiver system is on and the short range transceiver system is operable for a payment transaction;
   determining that the transaction device is no longer at the location; and
   responsive to the determining, deactivating the short-range transceiver system, wherein the deactivating places the short range transceiver system in a state in which it is inoperable for payment transactions,
   wherein the short-range transceiver system is different from the first receiver; and
   wherein the indication is indicative of at least one of: the transaction device being within a threshold distance from a short-range communications module on the list of short-range communication modules, or, the transaction device being within the geofence associated with the at-least one short-range communication module.

2. The method of claim 1, wherein the short-range transceiver system is used for short-range communication between the transaction device and a short-range communications module coupled to a computer system.

3. The method of claim 1, wherein the activating comprises sending a message from a location determining application at the transaction device to an application controlling the short-range transceiver system to activate the short-range transceiver system.

4. The method of claim 1, wherein the indication comprises receipt at the device of a beacon signal associated with at least one short-range communication module.

5. The method of claim 4, wherein the activating comprises sending a message from a first application at the transaction device to an application controlling the short-range transceiver system to activate the short-range transceiver system.

6. The method of claim 1, further comprising:
   capturing an image by the transaction device; and
   analyzing the image to determine whether a defined visual element is found within the image.

7. The method of claim 6, wherein the activating comprises sending a message from an image processing application at the transaction device to an application controlling the short-range transceiver system to activate the short-range transceiver system.

8. The method of claim 1, wherein the computing device is only operable to process a payment in the payment transaction when the short range transceiver system is turned on.

9. The method of claim 1, wherein the first receiver is a Global Navigation Satellite System (GNSS) receiver.

10. The method of claim 1, further comprising, receiving, from a server, an updated list of short range modules, or an updated geofence.

11. A transaction device comprising:
    a processor;
    a first receiver; and
    a short-range transceiver system;
    wherein the transaction device is configured to:
    receive a message, the message comprising at least one of a list of short-range communication modules or a geofence associated with at least one short-range communication module;
    receive, using the first receiver of the transaction device capable of communicating with a reader device, an indication, the indication being indicative of the transaction device being at a location;

responsive to receiving the indication, activate the short-range transceiver system of the transaction device by turning the short range transceiver system from an off state in which the antenna of the short range transceiver system is off and the short range transceiver system is inoperable for payment transactions to an on state in which the antenna of the short range transceiver system is on and the short range transceiver system is operable for a payment transaction;

determine that the transaction device is no longer at the location; and responsive to the determining, deactivate the short-range transceiver system, wherein the deactivating places the short range transceiver system in a state in which it is inoperable for payment transactions, wherein the short-range transceiver system is different from the first receiver; and wherein the indication is indicative of at least one of: the transaction device being within a threshold distance from a short-range communications module on the list of short-range communication modules, or, the transaction device being within the geofence associated with the at-least one short-range communication module.

12. The transaction device of claim 11, wherein the short-range transceiver system is used for short-range communication between the transaction device and a short-range communications module coupled to a computer system.

13. The transaction device of claim 11, wherein the transaction device is configured to activate by sending a message from a location determining application at the transaction device to an application controlling the short-range transceiver system to activate the short-range transceiver system.

14. The transaction device of claim 11, wherein the indication comprises receipt at the device of a beacon signal associated with at least one short-range communication module.

15. The transaction device of claim 14, wherein the transaction device is configured to activate by sending a message from a first application at the transaction device to an application controlling the short-range transceiver system to activate the short-range transceiver system.

16. The transaction device of claim 11, wherein the transaction device is further configured to:
capture an image by the transaction device; and
analyze the image to determine whether a defined visual element is found within the image.

17. The transaction device of claim 16, wherein the transaction device is configured to activate by sending a message from an image processing application at the transaction device to an application controlling the short-range transceiver system to activate the short-range transceiver system.

18. The transaction device of claim 11, wherein the transaction device is only operable to process a payment in the payment transaction when the short range transceiver system is turned on.

19. The transaction device of claim 11, wherein the first receiver is a Global Navigation Satellite System (GNSS) receiver.

20. The transaction device of claim 11, further configured to, receive, from a server, an updated list of short range modules, or an updated geofence.

21. A non-transitory computer readable medium for storing instruction code which, when executed by a processor of a transaction device, cause the transaction device to:

receive a message, the message comprising at least one of a list of short-range communication modules or a geofence associated with at least one short-range communication module;

receive, using the first receiver of the transaction device capable of communicating with a reader device, an indication, the indication being indicative of the transaction device being at a location;

responsive to receiving the indication, activate the short-range transceiver system of the transaction device by turning the short range transceiver system from an off state in which the antenna of the short range transceiver system is off and the short range transceiver system is inoperable for payment transactions to an on state in which the antenna of the short range transceiver system is on and the short range transceiver system is operable for a payment transaction;

determine that the transaction device is no longer at the location; and responsive to the determining, deactivate the short-range transceiver system, wherein the deactivating places the short range transceiver system in a state in which it is inoperable for payment transactions, wherein the short-range transceiver system is different from the first receiver; and wherein the indication is indicative of at least one of: the transaction device being within a threshold distance from a short-range communications module on the list of short-range communication modules, or, the transaction device being within the geofence associated with the at-least one short-range communication module.

* * * * *